United States Patent
Hu et al.

(10) Patent No.: US 7,532,334 B2
(45) Date of Patent: May 12, 2009

(54) TEMPERATURE CONTROLLING CASE

(75) Inventors: Pei-Hua Hu, Tu-Cheng (TW);
Hsu-Chih Liu, Tu-Cheng (TW);
Cheng-Ken Huang, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 165 days.

(21) Appl. No.: 11/522,782

(22) Filed: Sep. 18, 2006

(65) Prior Publication Data

US 2007/0070359 A1 Mar. 29, 2007

(30) Foreign Application Priority Data

Sep. 16, 2005 (TW) .............................. 94131965 A

(51) Int. Cl.
*G01B 11/14* (2006.01)
(52) U.S. Cl. ..................................... 356/625
(58) Field of Classification Search ................. 356/625, 356/43, 44

See application file for complete search history.

(56) References Cited

U.S. PATENT DOCUMENTS

2005/0034716 A1* 2/2005 Harbin .................... 126/25 R

* cited by examiner

*Primary Examiner*—Roy Punnoose
(74) *Attorney, Agent, or Firm*—Wei Te Chung

(57) ABSTRACT

A heat deflection testing equipment (10) for measuring tolerance of a sample (60) includes a temperature controlling case (30) and an optical sensor (20). The case includes a base (40) and a cover (50). The case has a carrier (41) defining a convective chamber (42) and a partition (44). The partition and the cover jointly define a heating chamber (49). An exhaust hole (440) communicating with the heating chamber and the convective chamber is on the partition. A sample carrier (46) has a datum plane (462). A number of air tubes (48) are set around the sample carrier with openings facing the sample. Incident beams (200, 202, 204) from the sensor are projected on the datum plane and the sample. Reflex beams (201, 203, 205) are reflected from the datum plane and the sample. The geometric tolerance can be measured by analyzing the incident beams and the reflex beams.

9 Claims, 7 Drawing Sheets

TEMPERATURE CONTROLLING CASE

BACKGROUND OF THE INVENTION

1. Field of the Invention

This invention generally relates to the art of heat deflection testing equipment for measuring tolerance and dimension of a sample under different temperatures.

2. Background of the Invention

Heat deflection testing equipments are widely used in measure field for getting tolerance and dimension of a sample under varying temperatures. A heat deflection testing equipment usually comprises a temperature controlling case and an optical sensor able to emitting detecting beams. In practical detection, the temperature controlling case includes a temperature controlling unit and a compressed gas controlling unit to control a temperature variation curve, for example a temperature variation curve of the surface mounting technology process, and imitate a temperature situation requested by the sample to be detected. The detecting beams emitted by the optical sensor include incident beams projecting on a datum plane and the sample via a window of the temperature controlling case and reflex beams reflected from the datum plane and the sample. The geometric tolerance can be measured by analyzing the incident beams and the reflex beams.

Please referring to relative references: Japan published patent application JP 2002-107116A and JP 2003-307412A.

The heat deflection testing equipment comprises a temperature controlling case and an optical sensor arranged below the temperature controlling case. The temperature controlling case comprises a base, a cover mounted on the base provide with a heat-resisting window for arranging the sample thereon. The window defines a datum plane for supporting the sample. The cover is connected with a blowing-in pipe thereby the compressed gas from the blowing-in pipe is heated by an infrared lamp in the cover and is spouting out from a nozzle. When the cover is in a closed state, the hot or cold gas from the nozzle spouts towards the sample through the sidewalls of the base. The geometric dimension of the sample can be measured by detecting the beams projected on the sample and the datum plane.

However, the heat deflection testing equipment lies in following problems: firstly, when the temperature controlling case is heated, the hot gas from the nozzle is via the sidewalls of the base which result in the hot gas can not directly spout on the sample; secondly, when the temperature of the temperature controlling case is dropped, the cold blast not only passes the sidewalls of the base but also absorbs heat remained on the infrared lamp. So during the whole imitating process of the temperature situation, the temperature controlling case can not provide quick variety of temperature which decreases the accuracy of the imitating temperature situation.

In addition, in abovementioned heat deflection testing equipment, devices used for detection have to be disposed under the sample, and the sensor is arranged under the temperature controlling case which make heat deflection testing equipment not easy carry and mate with the detecting device, therefore the equipment has a limit detecting scope, and is not able to detect the coefficient of heat expansion and shape distortion. The present invention is directed to solving these problems.

SUMMARY OF THE INVENTION

An object, therefore, of the invention is to provide a new and improved heat deflection testing equipment providing a quick temperature variety to realize curacy imitation of real temperature curve.

In the exemplary embodiment of the invention, a heat deflection testing equipment for detecting the dimension of the heated sample comprises a temperature controlling case and an optical sensor located under the temperature controlling case. The temperature controlling case comprises a base and a cover mounted on the cover. The base comprises a carrier with an unenclosed convective chamber and a number of partitions attached on the carrier. The carrier and the cover cooperatively form a heating chamber. The partition defines a exhaust hole through the convective chamber and the heating chamber and a sample carrier sandwiched by the partitions. The sample carrier defines a datum plane for supporting the sample thereon and a plurality of blowing-in pipes along the vent direction. The cover defines a heat-proof window on a center thereof. The sensor can move relative to the cover and generates incident beams and reflected beams. The incident beams are emitted from the sensor and pass through the window for projecting on the datum plane and the sample, so the geometric tolerance and the dimension variety can be attained by detecting the reflex beams reflected from the datum plane and the sample.

As disclosed herein, the equipment defines a number of blowing-in pipes on outer flank of the sample carrier along a direction of the wind gap. So the hot or cold blast directly blows on the sample, which enhances the speed of the temperature variety and attains an accurate imitation to the real temperature curve.

As an improvement of the invention, the equipment further defines a burbling plate between the temperature controlling case and the blowing-in pipes for perfecting the temperature distribution of the temperature controlling case.

As another improvement of the invention, height of blowing-out opening of the blowing-in pipe can be adjusted for being convenient to sample with different dimension to be detected.

As an improvement of the invention, the equipment further defines a number of detachable sensors for easily carrying the temperature controlling case and cooperating with other testing equipments.

As another improvement of the invention, the cover and the partition are made of heat-proof materials for getting a quick temperature variety in the temperature controlling case.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
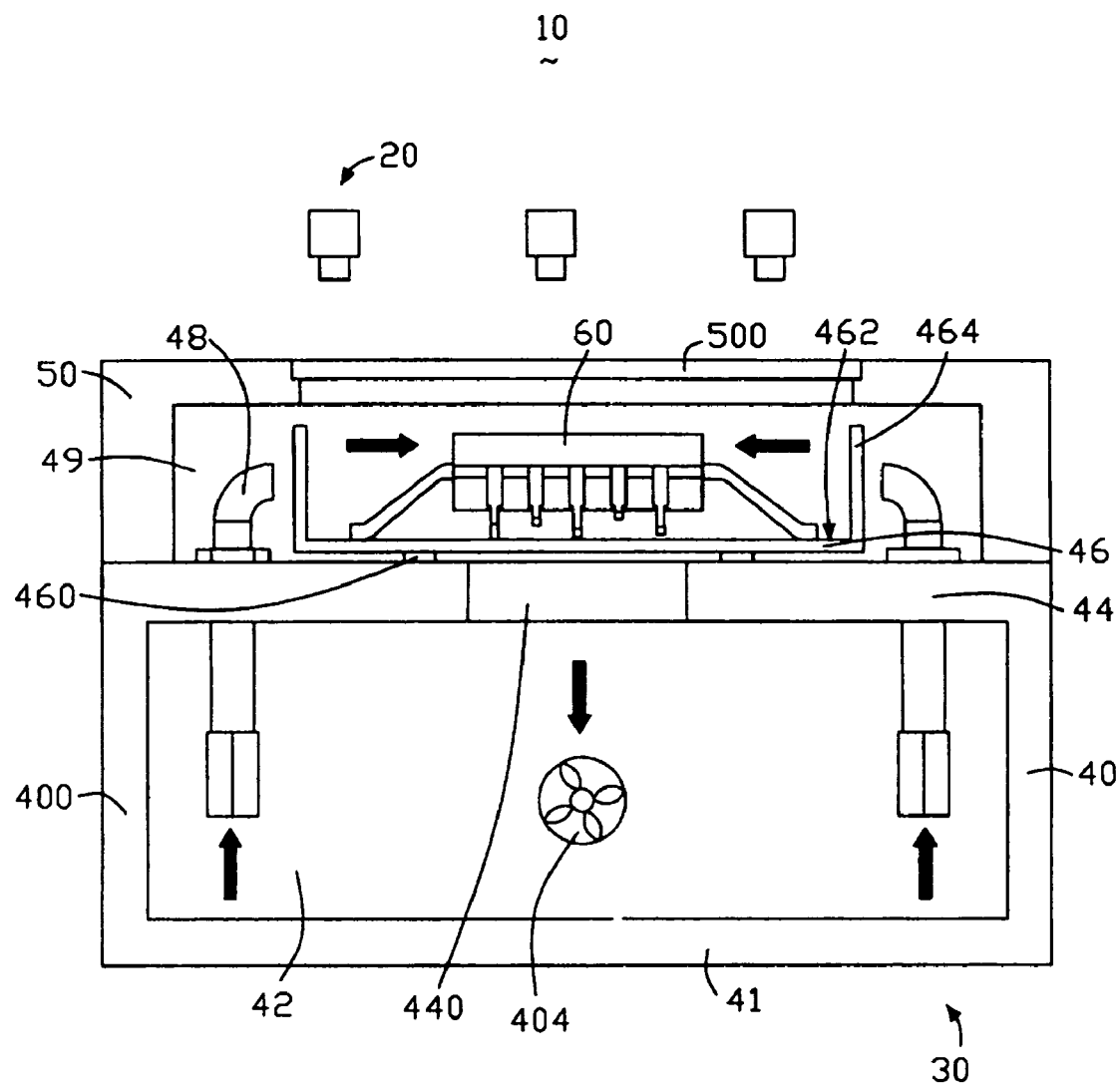
FIG. 1 is a perspective view of a heat deflection testing equipment embodying the concepts of the invention.

Referring to FIGS. 1-7 in greater detail, a heat deflection testing equipment 10 in correspondence with the embodiment of the invention for detecting geometric tolerance and dimension variety of the sample 60 comprises a temperature controlling case 30 and an optical sensor 20 disposed above the temperature controlling case 30.

Referring to FIGS. 3-7, the temperature controlling case 30 includes a base 40 and a cover 50 pivotally mounted on the base 40. The cover 50 can rotate about the base 40 from a closed position and an open position. The base 40 comprises a hollow carrier 41 and a partition 44 disposed in a top end of the carrier 41. The carrier 41 defines a number of sidewalls 400 with a vent 402. The sidewalls 400 and the partition 44 cooperatively form a convective chamber 42 communicating with outside via the vent 402, so the convective chamber 42 is an unenclosed room. In other embodiments of the invention, the sidewalls 400 can define a plurality of fans 404 for improving the air circulation.

Figure 5:
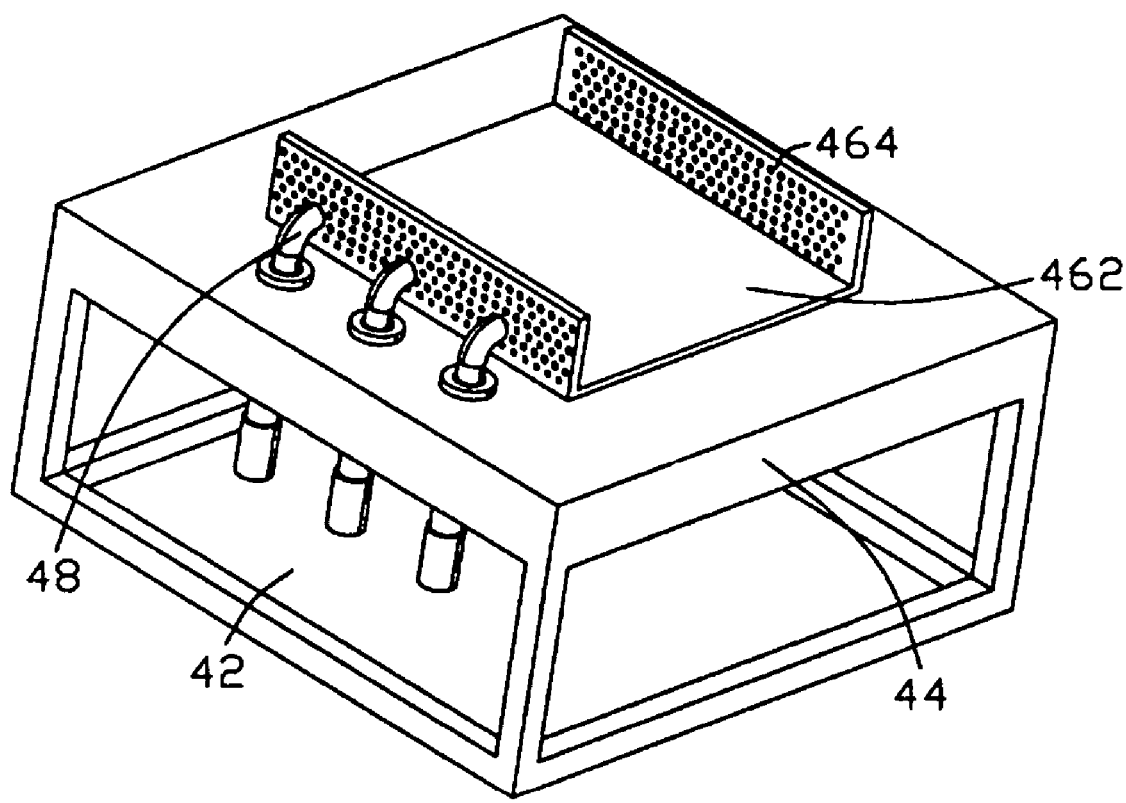
FIG. 5 is another isometric perspective view of the heat deflection testing equipment shown in FIG. 4, wherein the cover and sidewalls of the base are detached.
Figure 6:
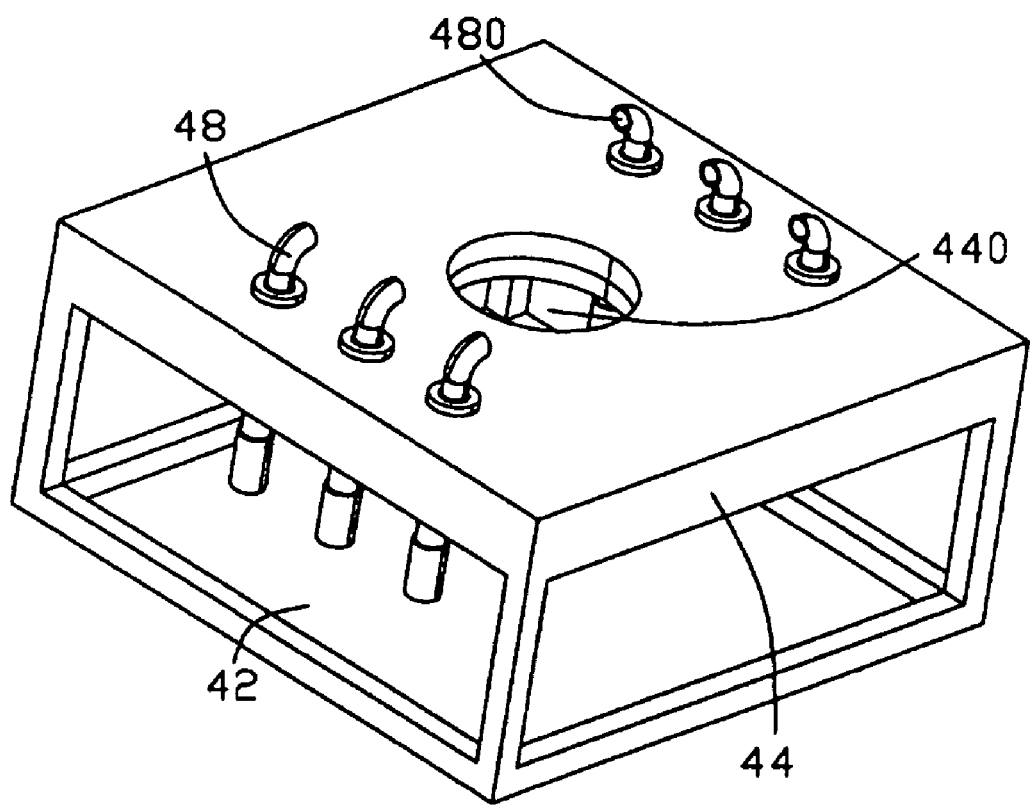
FIG. 6 is an isometric perspective view of the heat deflection testing equipment shown in FIG. 5, wherein the carrier is detached from the temperature controlling case.
Figure 7:
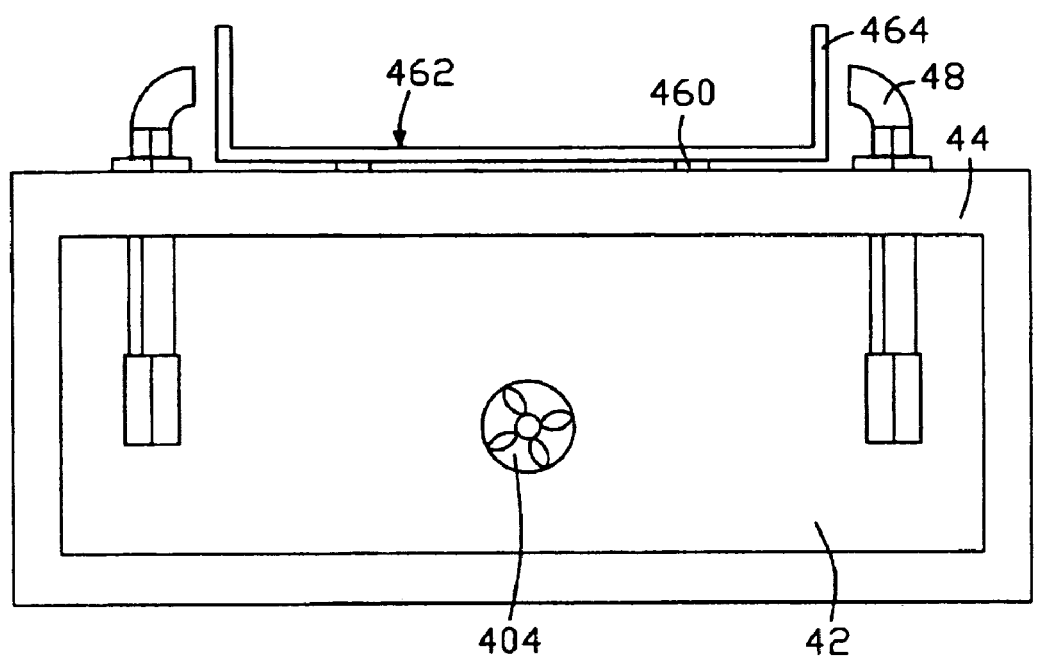
FIG. 7 is a side view of the heat deflection testing equipment shown in FIG. 5.

Specially referring to FIGS. 5-7, the partition 44 is made of heat-proof material and covers above the top end of the carrier 41. When the cover 50 of the temperature controlling case 30 is rotated to the close position, the partition 44 and the cover 50 cooperatively form a heating chamber 49. The partition 44 defines a exhaust hole 440 and a sample carrier 46 supported by a number of supporting pins 460. The sample carrier 46 defines a datum plane 462 with a smooth surface for supporting the sample 60. The datum plane 462 can provide a measuring datum for testing the geometric tolerance and the dimension varieties of the sample 60. The sample carrier 46 defines a number of blowing-in pipes 48 on two opposite sides thereof for gas flowing therethrough and the height of the pipes 48 can be altered in accordance with the height of the sample carrier 46 and the sample 60. The blowing-in pipe 48 receives a heating resistance wire (not shown) therein and the heating power of the heating resistance wire can be adjusted by a temperature controlling unit (not shown) of the temperature controlling case 30. The blowing-in pipes 48 further define a number of blowing-out openings 480 connecting with a compressed gas controlling unit. The gas flowing from the blowing-out opening 480 varies in light of predetermined temperature curve by controlling the heating power of the heating resistance wire and gas flux of the blowing-out opening 480. In others embodiments of the invention, the sample carrier 46 can arrange a number of symmetric blowing-in pipes 48 therearound for getting a rapidly varying speed of the temperature.

The heat deflection testing equipment 10 further defines a burbling plate 464 between the blowing-in openings 480 of the blowing-in pipes 48 and the burbling plate 464 extending vertically along the datum plane 462 of the sample carrier 46. The burbling plate 464 defines a plurality of through holes 4640 and can be arranged with the sample carrier 46 by an integrated molding art or separately molding. The burbling plate 464 not only changes direction of the air blowing out from the opening 480, but also improves a temperature distribution of the heating chamber 49.

Figure 2:
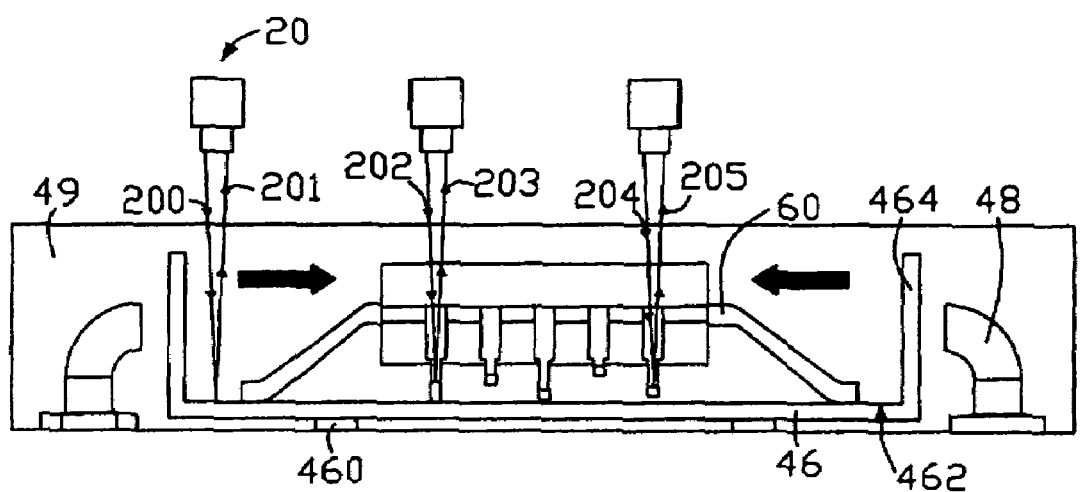
FIG. 2 is an isometric perspective view of beams path perspective the incident beams project on the sample and the datum plane, shown in the heat deflection testing equipment in FIG. 1.

Referring to FIGS. 2 and 5, the cover 50 is made of heat-proof material and comprises a heat-proof window 500 attached on a top end thereof. The heat-proof window 500 not only permits incident beams 200, 202, 204 and reflex beams 201, 203, 205 launched by the sensor 20 passing through but also facilitates to observe the sample 60 during testing. The cover 50 defines a temperature sensor(not shown) adjacent to a top portion thereof, so the heat deflection testing equipment 10 can adjust the gas flux and the heating power of the heating resistance wire via the temperature detected by the temperature sensor.

Referring to FIGS. 1-2, the optical sensor 20 is located below the temperature controlling case 30 and can move relative to the cover 50 along a plane parallel to the cover 50. The incident beams 200, 202, 204, launched by the sensor 20 pass through the cover 50 and project on the datum plane 462 and the sample 60 and the reflex beams 201, 203, 205 are reflected by the datum plane 462 and the sample 60. Distance between detecting points and the datum plane 462 can be detected by analyzing the incident beams 200, 202, 204 and reflex beams 201, 203, 205 so that the geometric tolerance and the dimension varieties of the sample 60 can be detected.

Figure 3:
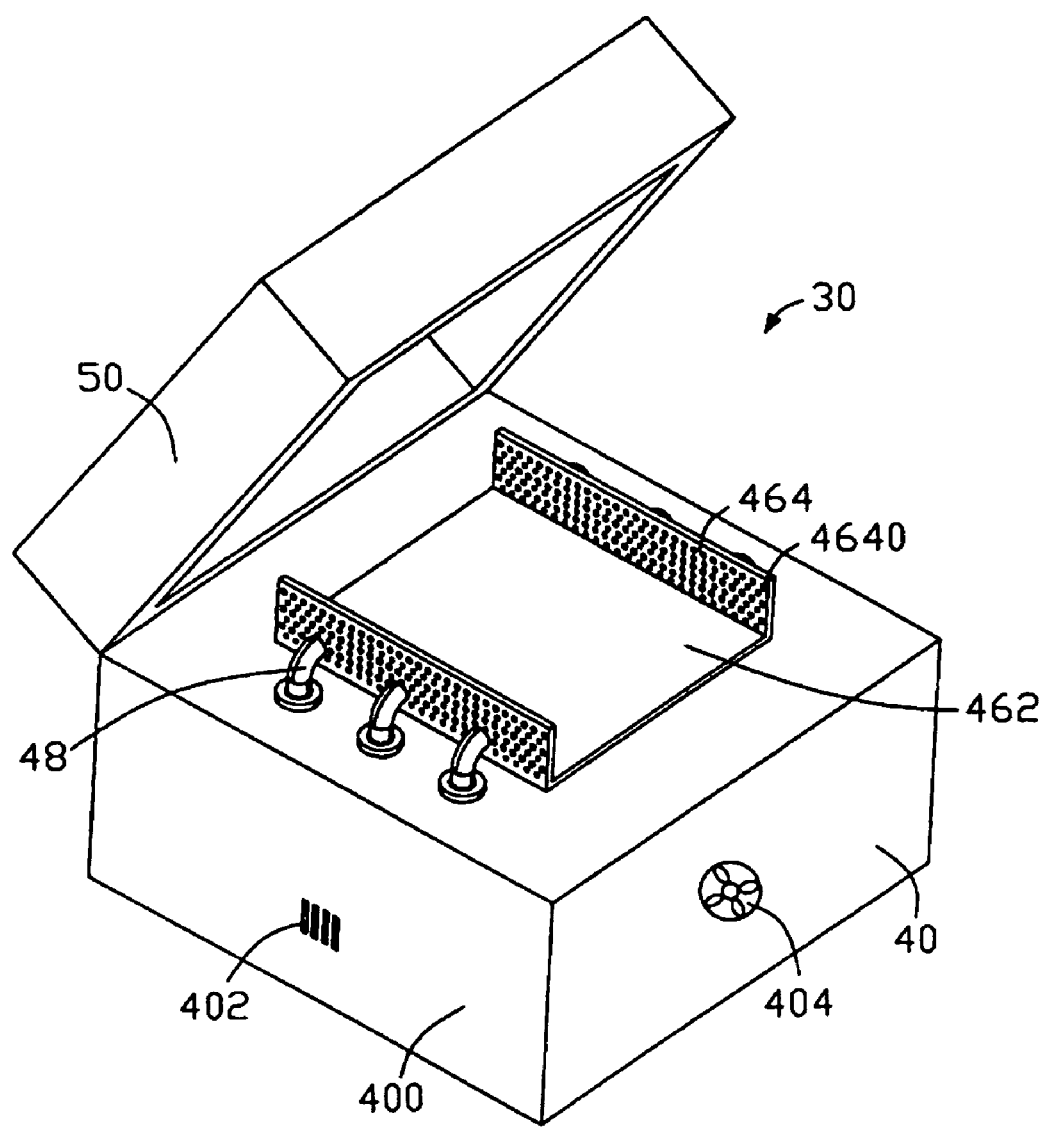
FIG. 3 is an isometric perspective view of the heat deflection testing equipment, wherein the cover of the temperature controlling case is open.
Figure 4:
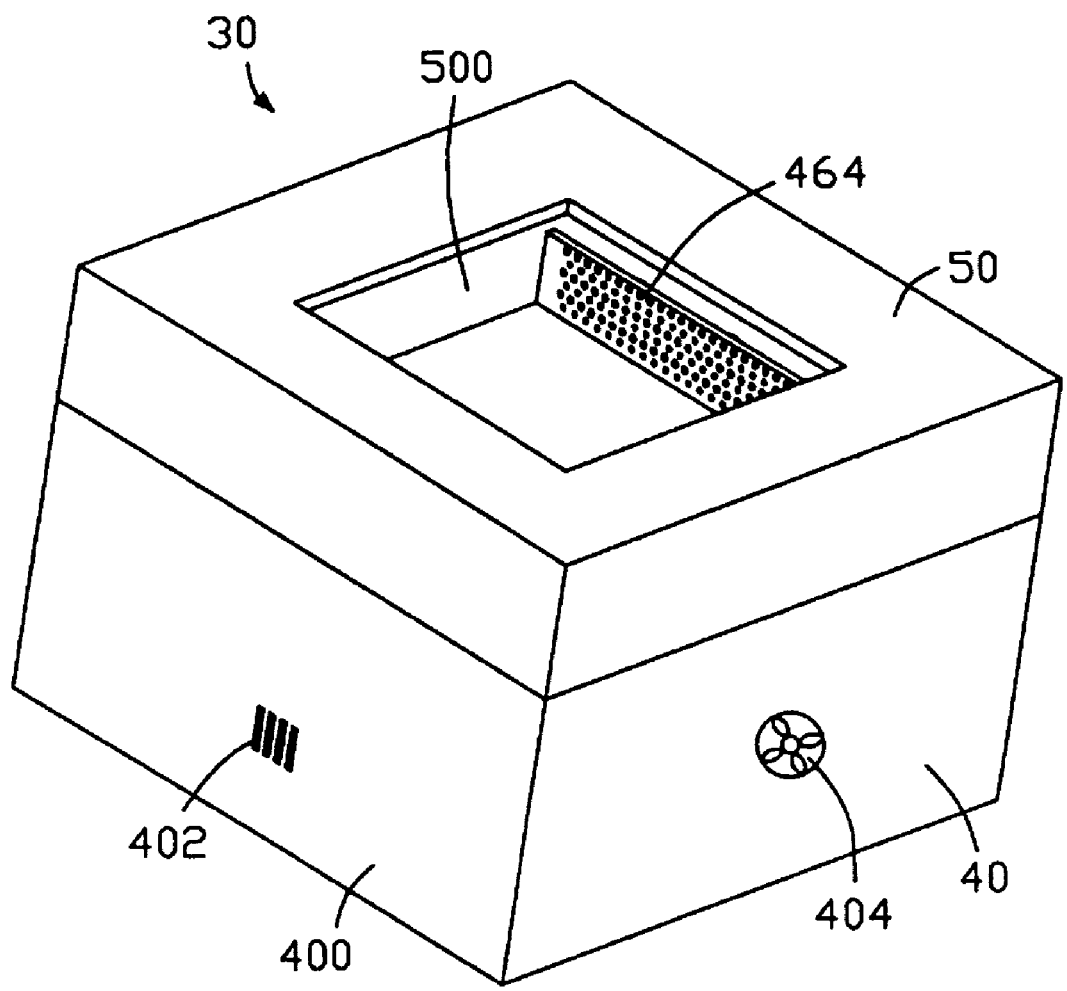
FIG. 4 is an isometric perspective view of the heat deflection testing equipment, wherein the cover of the temperature controlling case is closed.

Referring to FIGS. 3-4, in use, the cover 50 of the temperature controlling case 30 is firstly rotated to an open position. Successively, the sample 60 to be detected is arranged on the sample carrier 46 by a predetermined means. And then the blowing-in opening 480 is altered to a preferred height in light of the real dimension of the sample 60.

Referring to FIGS. 1-2, when the temperature controlling case 30 received the sample 60 to be tested is mounted under the sensor 20, the compressed gas controlling unit and the temperature controlling unit cooperatively realize the heating up curve or temperature reduction curve requested. During the heating or cooling process, the incidence beams 200, 202, 204 emitted by the sensor 20 pass through the window 500 and project on the datum plane 462 and the sample 60. Then, reflex beams 201, 203, 205 are reflected from the datum plane 46 and the sample 60. The geometric tolerance can be measured by analyzing the incident beams 200, 202, 204 and the reflex beams 201, 203, 205.

FIG. 1 is illustrating an air flow distribution of the temperature controlling case 30 of the heat deflection testing equipment 10 in the invention. The air flow flowing out from the blowing-in pipes 48 is distributed into two parts in two different direction, wherein one part of the flow passes through the through holes 4640 of the burbling plate 464 and then blows onto the sample 60, the other part of the flow disturbed by the burbling plate 464 forms into a turbulent flow, then the turbulent flow flows onto the sample 60. The air flow blows through the sample 60 and then passes through the exhaust hole 440, the convective chamber 42, and the vent 402 of the base 40 forms a fluently air passageway.

The blowing-in opening 480 of the blowing-in pipes 48 is disposed toward the sample carrier 46 so that the air flow coming from the blowing-in pipes 48 directly exerts on the sample 60 on the sample carrier 46. So the sample 60 can be quick heating up or temperature reduction in order to imitating a real temperature situation.

It is necessary to point out that the temperature controlling case 30 can be loaded in hot airs by the heating resistance or cold airs by cuffing off the heating resistance, and the hot air and cold air can be controlled to alter the temperature varying curve of the temperature controlling case 30. In addition, the optical sensor 20 can be disposed separately with the temperature controlling case 30 for mating with different detecting devices.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While preferred embodiment in accordance with the present invention have been shown and described, equivalent modifications and changes known to persons skilled in the art according to the spirit of the present invention are considered within the scope of the present invention as defined in the appended claims.

What is claimed is:

1. A temperature controlling case comprising: a hollow base surrounded by a number of sidewalls, a cover mounted on the base, the base defining a partition dividing the temperature controlling case into a heating chamber and a convective chamber, the partition comprising an exhaust hole communicating the heating chamber and the convective chamber, a sample carrier disposed above the exhaust hole, the sample carrier defining a number of through holes an outsides thereof and a number of blowing-in pipes, the sidewalls defining a number of vents, gas delivered by the blowing-in pipes passing through holes, the exhaust hole, the convective chamber, the vents forming an air flow passageway.

2. The temperature controlling case as claimed in claim 1, wherein the blowing-in pipes are arranged at two opposite sides of the sample carrier.

3. The temperature controlling case as claimed in claim 1, wherein the blowing-in pipes are symmetrically arranged round the sample carrier.

4. The heat deflection testing equipment as claimed in claim 1, furthering comprising a burbling plate disposed between the blowing-in pipes.

5. The temperature controlling case as claimed in claim 1, wherein the burbling plate and the sample carrier are formed as one-piece.

6. The temperature controlling case as claimed in claim 1, wherein the sample carrier is supported by a number of supporting pins extending from the partition.

7. The temperature controlling case as claimed in claim 1, wherein the base defines at least one fan on the sidewalls thereof.

8. The temperature controlling case as claimed in claim 1, wherein height of the blowing-in pipes relative to the partition can be altered.

9. A temperature controlling case comprising: a hollow base surrounded by a number of sidewalls, a cover mounted on the base, the base defining a partition dividing the heat deflection testing equipment into a heating chamber and a convective chamber, the partition comprising a number of blowing-out holes communicating the heating chamber and the convective chamber, a carrier disposed above the blowing-out holes, the carder defining a number of blowing-in holes on outsides thereof facing a number of blowing-in pipes, the air delivered by the blowing-in pipes passing through blowing-in openings of the carrier, the heating chamber, the convective chamber, and thus forming an air flow passageway.

* * * * *